United States Patent [19]
Ralston et al.

[11] Patent Number: 5,088,553
[45] Date of Patent: Feb. 18, 1992

[54] LATERAL CUTTER DEVICE

[75] Inventors: Trent H. Ralston, Harwood, Md.;
Kenneth R. Guthrie, Orlando, Fla.;
James C. Veatch, Annapolis, Md.

[73] Assignee: TRB Specialty Rehabilitation, Inc.

[21] Appl. No.: 630,313

[22] Filed: Dec. 19, 1990

Related U.S. Application Data

[62] Division of Ser. No. 470,056, Jan. 25, 1990.

[51] Int. Cl.$^5$ .............. E03F 3/06; E21B 97/09
[52] U.S. Cl. .................. 166/55.7; 166/66;
407/56; 408/21; 409/143
[58] Field of Search .............. 409/132, 143, 179, 190;
408/6, 26, 130, 224, 225, 715, 206, 21; 144/219;
324/644; 29/33 T, 566; 175/77, 78; 166/50,
55-55.8; 83/185, 186; 407/56, 58, 61

[56] References Cited

U.S. PATENT DOCUMENTS

| | | | |
|---|---|---|---|
| 3,562,642 | 2/1971 | Hochschild | 324/644 X |
| 3,672,785 | 6/1972 | Byrne | 408/206 |
| 4,029,428 | 6/1977 | Levens | 408/127 |
| 4,197,908 | 4/1980 | Davis et al. | 409/143 X |
| 4,431,017 | 2/1984 | Willemsen | 408/92 X |
| 4,437,526 | 3/1984 | Gloor | 175/346 |
| 4,442,891 | 4/1984 | Wood | 166/55.2 |
| 4,577,388 | 3/1986 | Wood | 29/558 |
| 4,613,812 | 9/1986 | Gelston, II | 408/6 X |
| 4,630,676 | 12/1986 | Long, Jr. | 166/55 |
| 4,648,454 | 3/1987 | Yarnell | 166/55.7 X |
| 4,701,988 | 10/1987 | Wood | 166/55.2 |
| 4,765,173 | 8/1988 | Schellstede | 166/55.2 X |
| 4,819,721 | 4/1989 | Long, Jr. | 166/55 |
| 4,951,758 | 8/1990 | Sonku et al. | 166/55.2 X |
| 4,955,951 | 9/1990 | Nemoto et al. | 166/55.7 |

FOREIGN PATENT DOCUMENTS

| | | |
|---|---|---|
| 5214287 | 7/1975 | Japan . |
| 0014287 | 2/1977 | Japan .................. 408/206 |

Primary Examiner—Z. R. Bilinsky
Attorney, Agent, or Firm—Shoemaker and Mattare, Ltd.

[57] ABSTRACT

A system for cutting lateral holes in plastic pipe liners at the locations of lateral taps in a surrounding pipe comprises a cylindrical body which is inserted into the pipe liner, and remote devices for observing and controlling operation of the body. A rotary cutter, having axial and radial cutting teeth, can be remotely translated in three dimensions with respect to the body, making it possible to cut non-circular holes; the body can be rotated about its axis within the liner as well. A video camera on the sled permits observation of the cutter. Lateral taps are precisely located by monitoring return signals from a microwave transmitter/receiver on the sled, and identifying points of maximum deviation in microwave reflection.

5 Claims, 8 Drawing Sheets

LATERAL CUTTER DEVICE

This is a division, of application Ser. No. 07/470,056, filed Jan. 25, 1990.

BACKGROUND

1. Field of the Invention

This invention relates generally to the art of pipeline repair, and more particularly to a device for cutting accurately placed and shaped lateral outlets in the liner of an underground pipeline, such as sewer pipe.

2. Description of the Prior Art

Various techniques are known for lining sewer pipes and other buried fluid conduits, when they have developed leaks. In one such method, a long length of cuffed polyethylene tubing is everted as it is pushed into the pipe, covering the interior surface of the pipe with an unbroken plastic lining. The task then remains of cutting lateral outlets in the lining, at positions exactly corresponding to the existing lateral taps on the original pipe, which may be of cast iron or clay.

The devices disclosed in prior patents appear satisfactory to cut holes through pipe linings, once the proper location of the hole has been determined. But before a lateral outlet can be cut, its proper location must first be identified. Prior inventors have had to rely on pipe surveys conducted before the relining procedure, in order to know exactly, or at least approximately, where to cut the lateral outlets. Surveying errors could thus result in ruining the lining, the existing pipe, and/or the lateral cutting tool.

Some inventors have tackled this problem. For example, U.S. Pat. No. 4,577,388 discloses an apparatus comprising a sled which is pulled through a newly lined pipe. The sled has a TV camera for viewing the pipe or lining, and a rotary cutter mounted for "universal" movement on the sled. The camera and cutter are used first to survey the pipe prior to relining, coordinates of the pipe outlets being stored in memory, and then, after the pipe is relined, to cut holes in the lining at the memorized locations. The position of the cutter may be controlled in two dimensions, whereby non-circular holes can be obtained.

U.S. Pat. No. 4,648,454 also solves the problem of reestablishing lateral connections in a lined pipe, by providing a sled that can be towed through the lining, the sled comprising structure for supporting a rotary cutter which first pierces the lining and then enlarges it, using the preexisting outlet as a template.

Other patents of interest include U.S. Pat. Nos. 4,197,908, 4,442,891, 4,701,988, 4,819,721, and 4,630,676.

Non-mechanical methods of locating hidden sewer outlets have included using ultrasonic energy; however, for such a method to work, good acoustical contact is imperative, and this is problematic with a device that moves unattended through underground piping, which may not be free of debris and other acoustic contaminants.

Infrared inspection has also been considered. However, the material from which sewer liner is commonly made is opaque to infrared radiation.

Another problem encountered in cutting holes through pipe liners is that, particularly where a lateral pipe meets the main line at a non-perpendicular angle, their intersection may be substantially non-circular. It is desirable to cut a hole in the liner most closely corresponding with the original hole, so as not to create obstructions. While some prior inventors have addressed this problem, an improved device for cutting non-circular holes is needed.

SUMMARY OF THE INVENTION

In view of the foregoing, it is an object of the invention to enable one to determine with precision the location of lateral taps in an underground pipe which has been relined, without reliance on pipeline surveys, and without penetrating the lining material.

A related object is to enable one to locate lateral pipe outlet points through a lining, nondestructively, and to cut and ream holes through a lining at those points, with a single unit in a single pass through the pipe.

An important aspect of the invention is its ability to determine where lateral holes should be cut, even without having the benefit of a pipe survey. With this invention, lateral outlets are made by broadcasting microwaves from a sled toward the lining, receiving reflected signals, and remotely observing the magnitude of the reflected signal. By monitoring signal levels and identifying minimum and maximum points, the precise determination of lateral tap points is possible. An advantage of using microwave technology in lined sewers is that the lining material readily passes microwaves, whereas the pipe itself does not. Relatively low power transmission can be used because of the short distances involved. And the equipment required to transmit and receive microwaves signals is commercially available, in compact sizes.

One aspect of the invention is embodied in a device for cutting lateral holes in a pipe liner, from the inside thereof, comprising a body movable within the pipe, a rotary cutter including a motor and a head, driven by the motor, for both boring and enlarging holes in the tube, means for supporting the cutter within the body, said means allowing three-dimensional translatory movement of the cutter with respect to the body, and means for moving the carriage in any of the three directions with respect to the body, whereby holes of various sizes and shapes may be cut in the tube.

The device preferably has feet for engaging the interior of the pipe lining, the feet being mounted in collars surrounding the body, with respect to which the body can rotate about its axis. The body supports the microwave transmitter-receiver mentioned above, and a video camera and associated illuminating devices, as well. The camera views the cutter head, enabling an operator at the surface to set the inclination and position of the cutter properly, and to monitor the cutting procedure.

Not only is the cutting process remotely observable with this invention; it is also completely remotely controllable. All motions of the unit are produced by fluid driven motors having individual lines connecting the unit to a source of pressure at the surface. The pressure in each line may be independently controlled by the operator by appropriate valving.

BRIEF DESCRIPTION OF THE DRAWINGS

In the accompanying drawings.

DESCRIPTION OF THE PREFERRED EMBODIMENT

Figure 1:
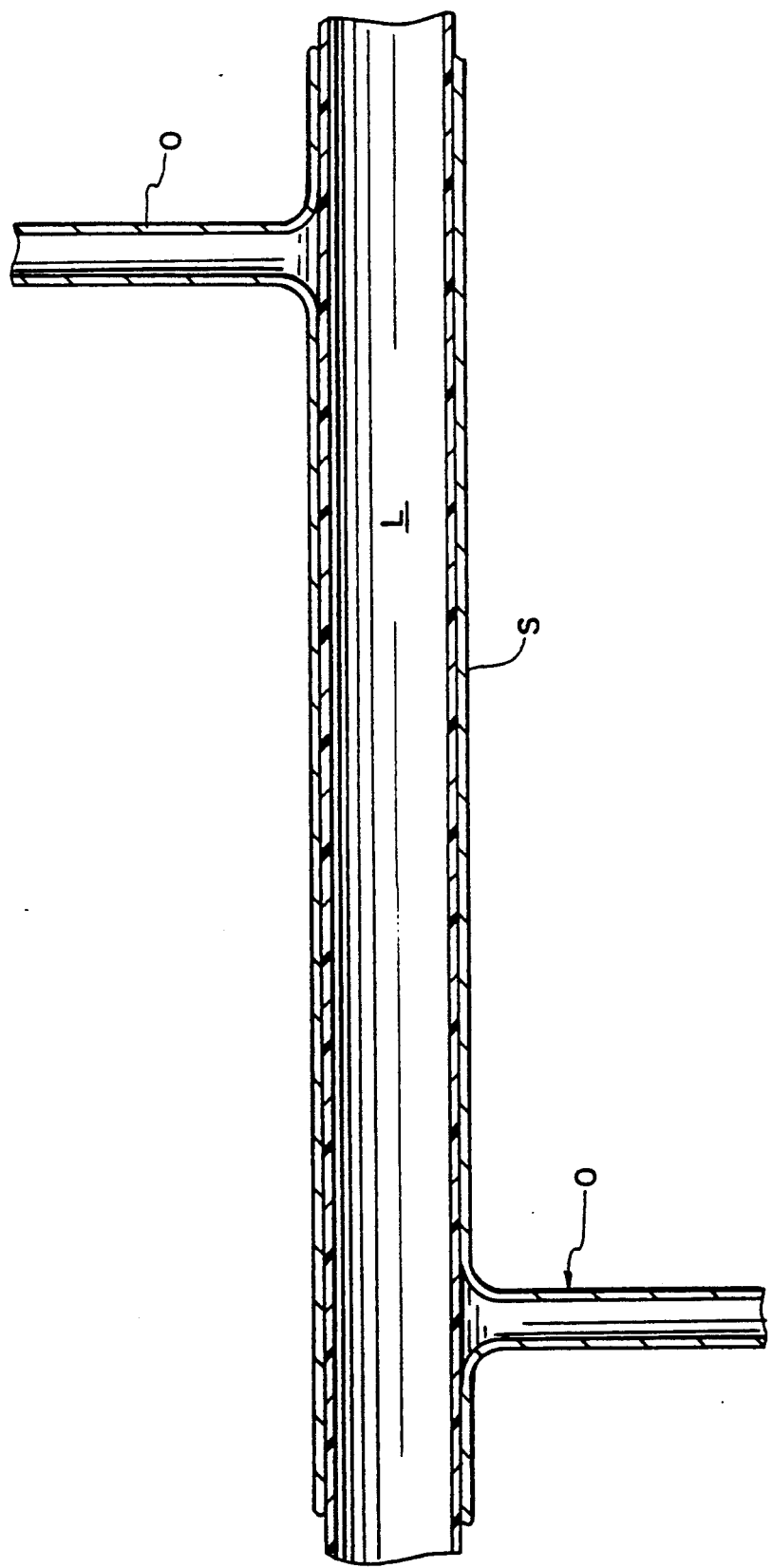
FIG. 1 is a top sectional view of a sewer pipe which has been relined with a continuous liner covering the lateral outlets or taps from the pipe.
Figure 2:
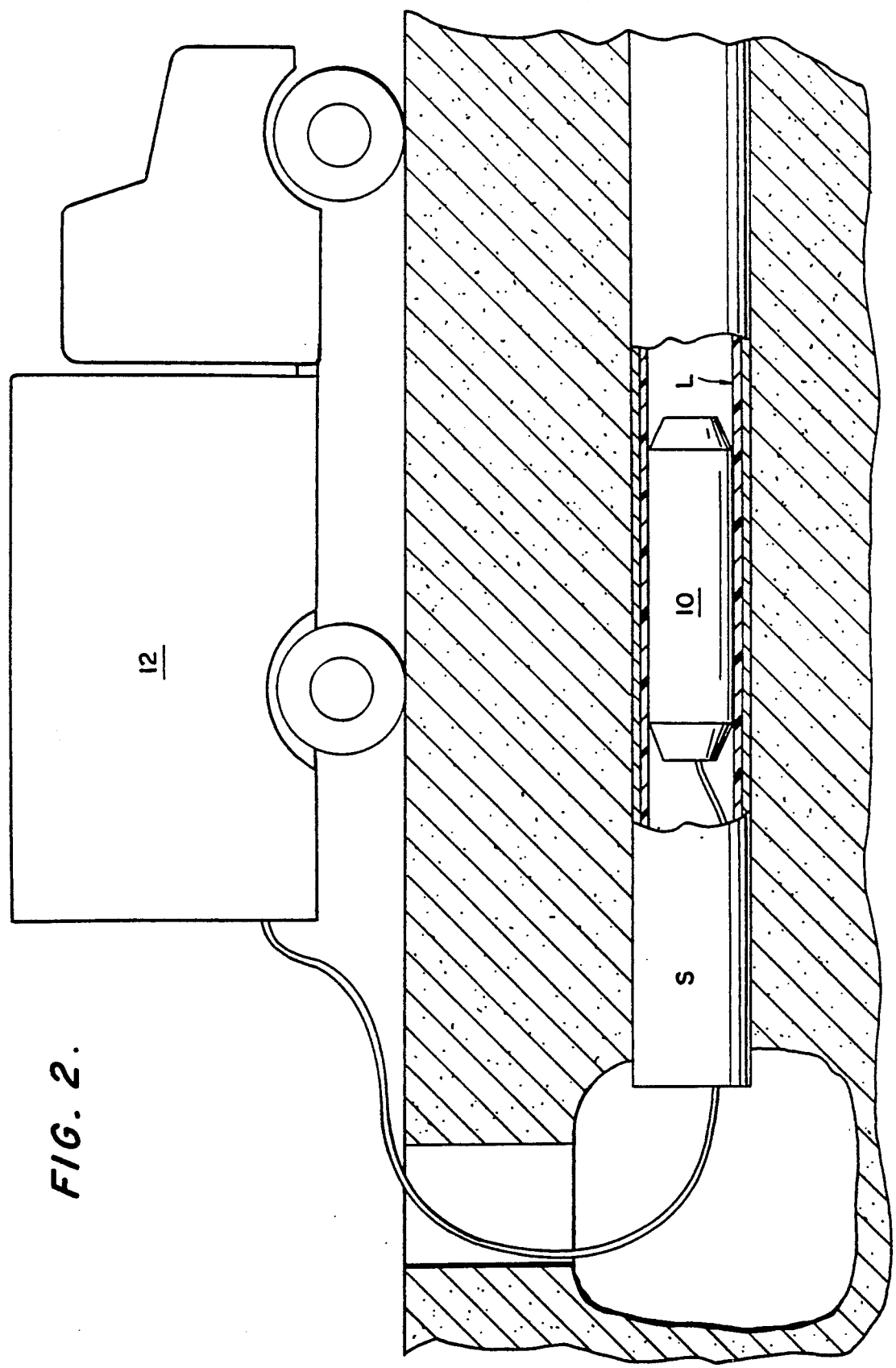
FIG. 2 is a schematic showing major components of a system for locating and cutting lateral outlets in the liner.

FIG. 2 shows, in schematic form, a system for locating and cutting holes through a tube such as the plastic lining L of a buried cast iron or clay sewer pipe S, having lateral outlets O, illustrated in top section in FIG. 1. The system comprises a cutting unit 10, which is pushed or pulled through the pipe by conventional mechanical or pressure means, not shown, and a remote station 12 from which progress of the cutting unit is observed and controlled.

Figure 3:
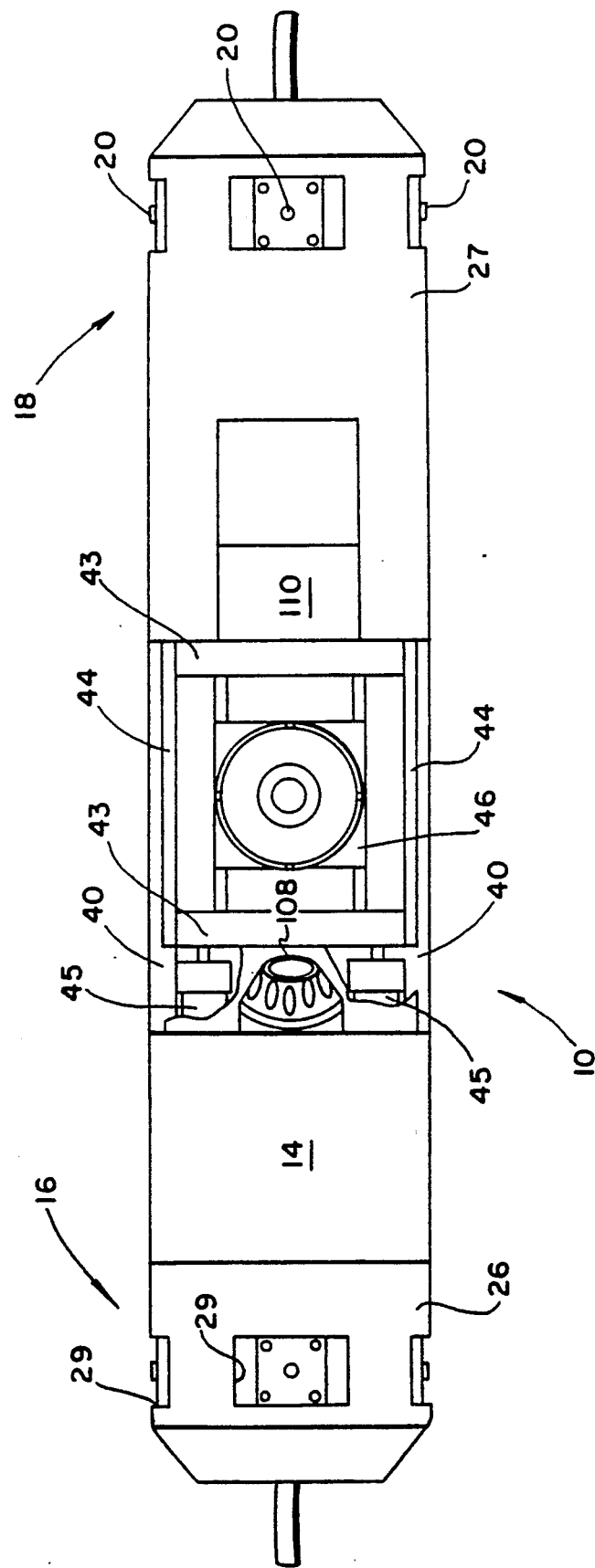
FIG. 3 is a top view of a lateral cutter device embodying the invention.
Figure 4:
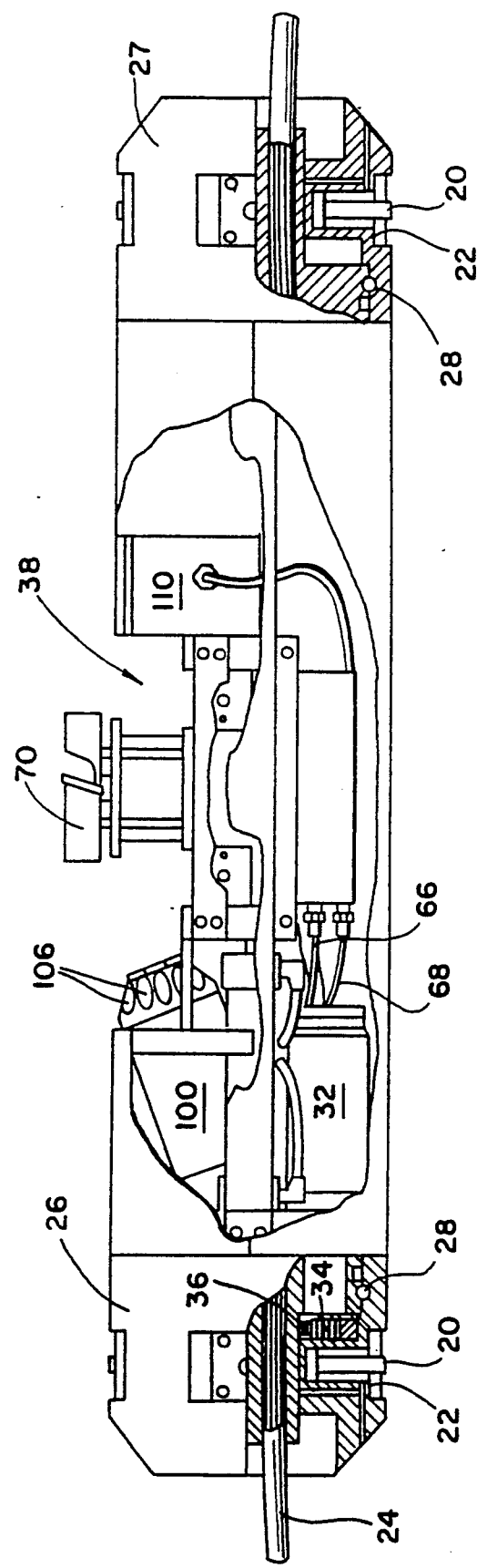
FIG. 4 is a side view thereof.

As shown in FIG. 3, the cutting unit 10 comprises a body 14 having, at each end 16, 18 a collar or casing 26, 27, each containing four equally spaced feet 20 for engaging the interior surface of the pipe lining. Each foot 20 is actually the end of a piston rod extending from a linear fluid motor (i.e., a hydraulic cylinder 22, two of which are shown in section in FIG. 4) driven by pressurized fluid transmitted from the surface by a conduit bundle 24. The cylindrical casings 26,27 are supported on the body by axial bushings or bearings 28, so that the body has limited rotational freedom within the casings.

Turning or rotation of the body is controlled by means of a rotary, fluid-driven motor 32 (FIG. 4) having a fluid pressure inlet line and, preferably, an outlet line. These lines, and others for motors mentioned subsequently, are not shown, for the sake of clarity.

If one uses an environmentally harmless fluid, such as water or air, an outlet line may not be required; however, the provision of two lines to a particular motor is preferred, since that enables that motor to be driven bidirectionally.

The motor 32 has an output shaft, with a pinion 34 mounted thereon. The pinion engages a ring gear 36 affixed to one of the casings, 26. The other casing 27 is free to rotate with respect to the body.

The body 14 has a large central aperture or cavity 38, containing a pair of spaced, parallel, slide surfaces or ways 40 (FIG. 3) extending parallel to the axis of the body. These ways support a rectangular carriage 42, comprising parallel end plates 43 interconnected by side plates 44. The carriage can be moved along the ways by means of a pair of linear motors 45, whose axes are also parallel to that of the body. The linear motors are preferably fluid-driven motors, specifically, double-acting hydraulic cylinders.

Figure 5:
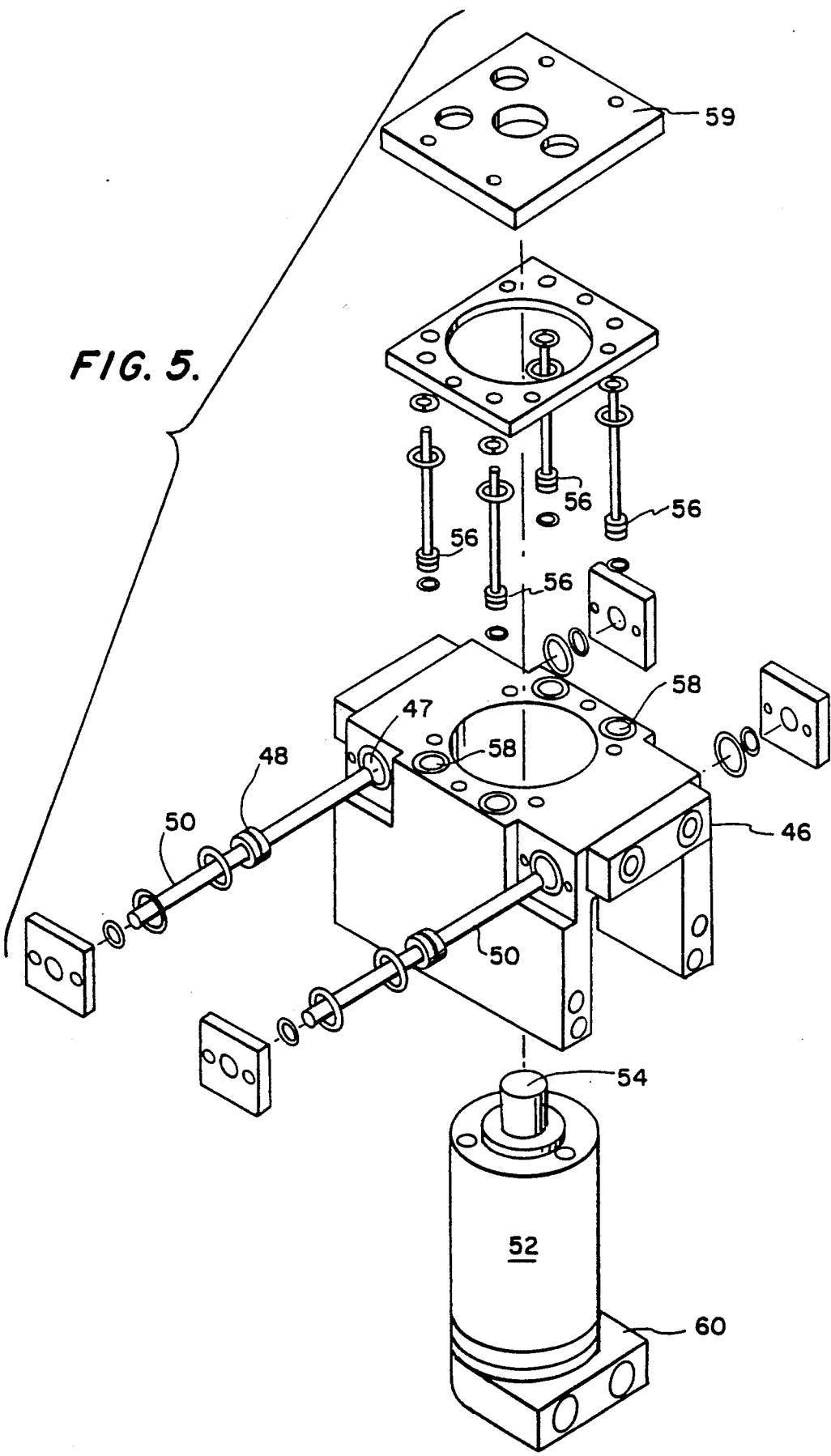
FIG. 5 is an exploded view, in isometric, of a portion of the device.

The carriage 42 supports and confines a motor support block 46, which can slide laterally between the end plates 43. The block 46 contains a pair of laterally oriented fluid motors, specifically pistons 48 (FIG. 5), each having piston rods 50 extending from both ends into engagement with the side plates 44 of the carriage. By applying differential pressures across the piston faces, the block can be moved laterally of the carriage, and since the carriage itself if longitudinally movable, the block can move both longitudinally and laterally with respect to the body 14.

The motor support block 46 supports a rotary motor 52 having an output shaft 54. The motor can be elevated (i.e., moved in a direction orthogonal to the longitudinal and lateral directions) with respect to the block, by four pistons 56, and thus (since the block can move in two directions) has three linear degrees of freedom with respect to the body 14. The pistons 56 are situated within respective bores 58 machined in the the block; they are attached at their upper ends to a plate 59 to which the motor 52 is in turn attached. A base 60, affixed at the lower end of the motor 52, has a rectangular portion sized to pass closely between the side plates 62 of the block 46, to resist reaction torque from the motor during cutting.

Fluid inlet lines 66 and outlet lines 68 (FIG. 4) lead from each of the motors to the control unit at the surface.

A cutter head 70, affixed upon the shaft 54 of motor 52, protrudes through the aperture 38 in the body; the aperture is large enough to accommodate the ranges of three dimensional movement of the cutter, and to enable the video camera described later to "see" the cutter head and pipe lining. The space between the cutter head and the aperture is covered by an elastomeric seal or boot 74, that prevents cuttings and water from fouling the workings of the unit.

Figure 6:
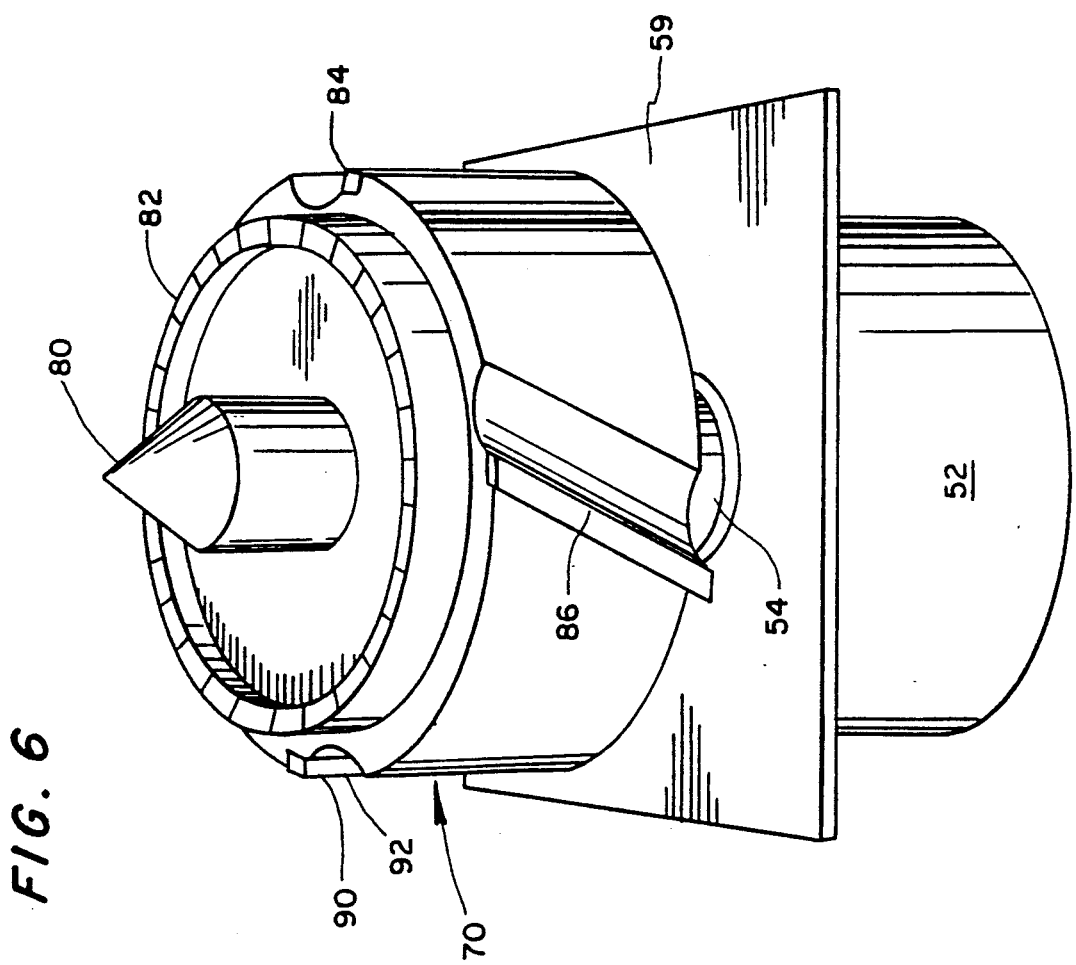
FIG. 6 is a detail of the cutter head alone.

The cutter head, shown in detail in FIG. 6, includes three interconnected, coaxial cutting members: a pilot bit 80, a hole saw 82, and a reamer 84. Of these three, the pilot bit projects the furthest, so that it is the first cutter to come into contact with a pipe lining. The reamer projects the least, so that it engages the lining only after the lining has been cut through by the saw. The pilot bit and hole saw are conventional.

The reamer includes plural teeth 86 having both radial 90 and oblique, peripheral 92 cutting edges, the former serving to enlarge a hole cut by the saw, and the latter, which tapers outwardly slightly, for finishing the edge of the hole. The axial cutting edges 94 also permit the reamer to function as a lateral milling cutter, so that once a hole has been established, it can be enlarged, or made non-circular, by moving the cutter head laterally.

A video camera 100 (FIG. 4) is mounted at one end of the body, and substantially within it. Wiring for powering the camera, and for transmitting its video signal to the surface, is run with the bundle 24 of fluid lines extending to the control unit 12. An array of lamps 106 is disposed around the camera lens 108 (FIG. 3), for illuminating the field of view. The camera is directed at the cutter head, whose operation can thus be observed. The camera itself is conventional.

At the other end of the body, within it (FIG. 4), there is a microwave unit 110 comprising a transceiver in close proximity to the surface of the unit 10.

The presently preferred microwave unit is available from Microwave Associates, Inc., Burlington, Massachusetts, Model No. MA86728. Either K or X band transceivers may be used. The X band assembly contains a transceiver unit, a voltage regulator, and an antenna. The microwave transceiver comprises two Gunn diodes, one used as a transmitter, and the other as a mixer. The transmitter is biased with 8 volts D.C. (nominal), which creates a 10 dBm microwave signal. The reflected portion of the signal biases the mixer diode with a D.C. voltage The X-band transceiver operates at a frequency of 10.525 GHz with a power level of +10 dBm (10 mW). The antenna is built into the housing of the assembly and is used to narrow the beamwidth of the microwave signal. The regulator supplies 8 VDC @ 200 mA for the transmitter diode. A 10 uF capacitor is used to cut down on noise in the receive signal.

The K band assembly is basically the same, except that its transceiver operates at a frequency of 24.150 GHz. We prefer to use two transceivers and antennas, to provide good resolution both vertically and horizontally, or to provide redundancy in case of failure of one.

Above ground, the control and monitoring unit 12, preferably truck-mounted, comprises analog and digital display devices for monitoring reflected microwave signal levels, a monitor for displaying the scene viewed by the video camera, and valves for controlling the five fluid motors of the cutting unit. The analog display is constructed with an array of LED's rather than a meter, for better reliability and visibility.

Figure 8:
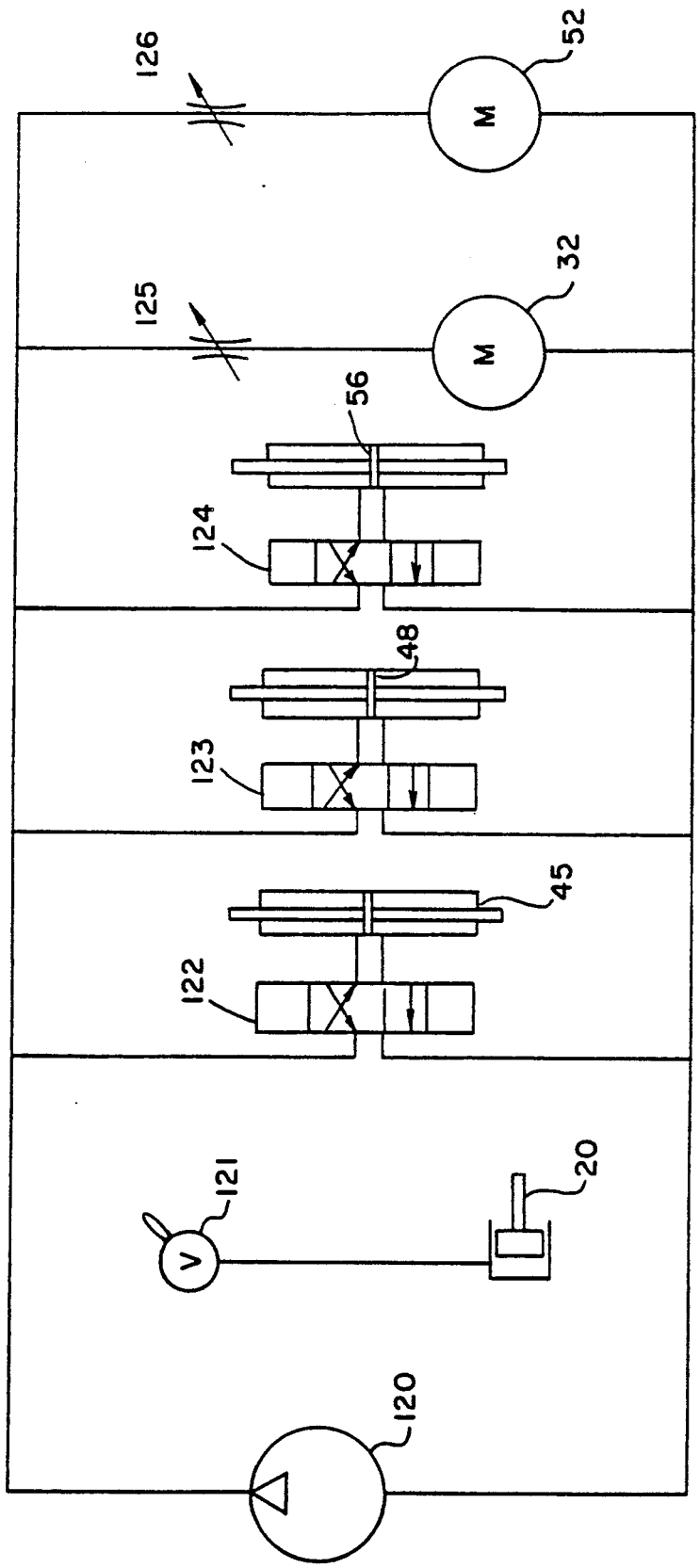
FIG. 8 is a fluid schematic of the invention.

As shown diagrammatically in FIG. 8, the motor controller includes a source of fluid pressure 120, and a set of valves 121,122,123,124,125,126. These valves control, respectively, movement of the feet 20, the linear motors 45, 48 and 56, and the rotary motors 32 in 52. By appropriate operation of these valve, the operator can control yaw of the casing with respect to the body, the position of the cutter head in three dimensions, and the torque (under load) or speed (no load) of the cutter head.

There are two types of visual display in the control unit: a video display and an analog bargraph display.

The video display is a conventional television monitor connected directly to the video camera by means of the conductors.

Figure 7:
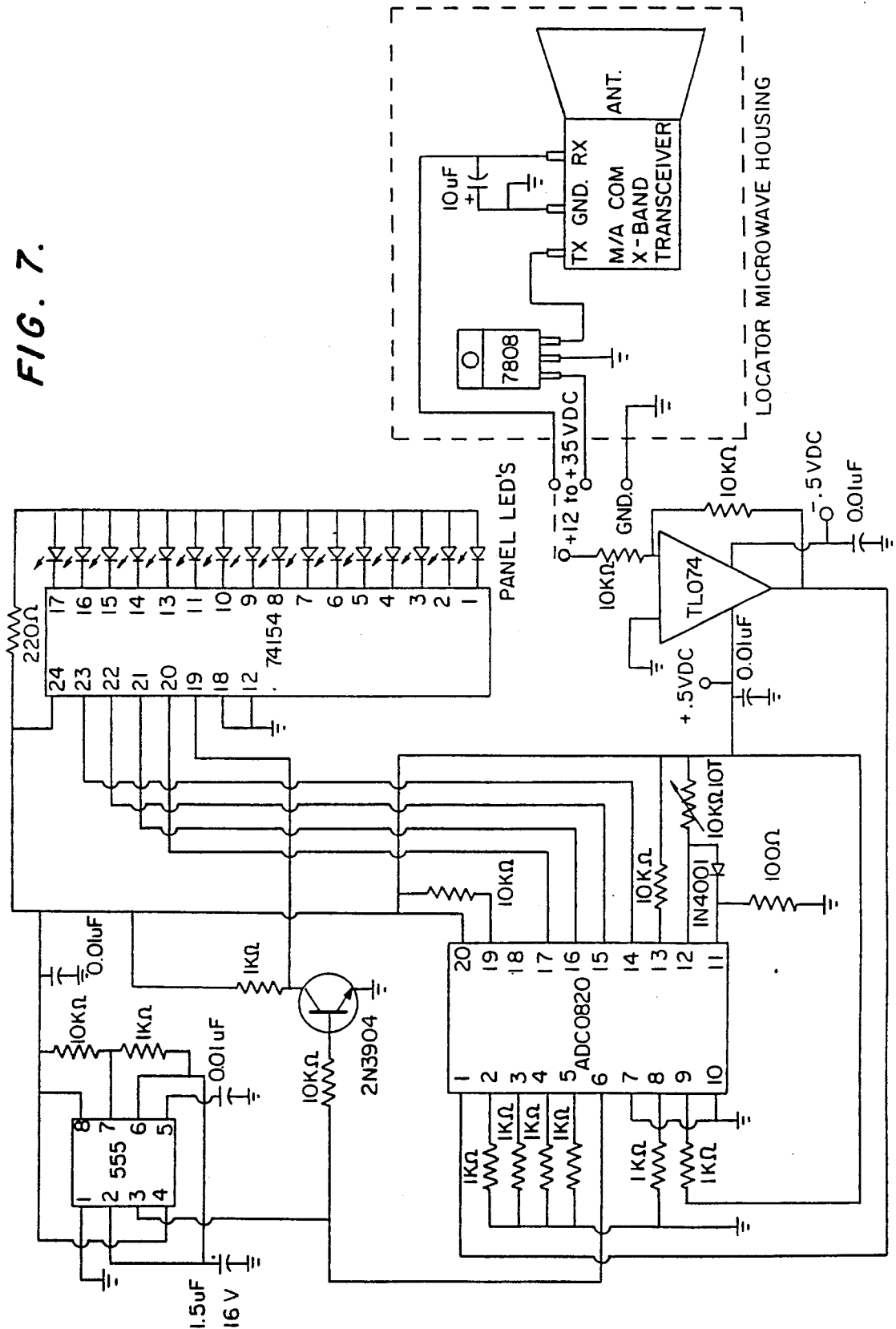
FIG. 7 is a electric schematic of the invention.

The bargraph display circuit, shown in FIG. 7, comprises an analog to digital converter, a TTL decoder, a simple clock circuit, and an input amplifier. The circuit board used to drive the bar graph display also contains interface circuitry to connect a digital panel meter.

The A/D converter is a National Semiconductor ADC0820, which provides eight-bit binary output. The reference voltage for the converter is variable, allowing the operator to set the range of the bargraph. The output of the A/D converter is decoded by a 74154 chip which drives the 16 front panel LED's. The clock is used to trigger the A/D converter and to activate the decoder when the data is valid. A 555 timer chip is used in an astable configuration with a frequency of 83 Hz and a duty cycle of about 50%. The input circuit has a gain of −2, which inverts the signal and compensates for losses in the cable 24.

Instead of, or in addition to, the visual display of microwave output, one could employ an audio tone representative of signal level, so that the operator would not be visually bound to the monitor. The use of an audio signal would facilitate tape recording results of a pipe survey.

Also, a microphone could be mounted on the cutting unit, connected to a headset or speaker in the control area so that the operator could hear, as well as see, the cutting operation. In some instances, deviations in the audible signal would provide early warning of malfunctions or errors, such as the cutter head making contact with the original pipe material.

An electrical amplifier may be used, if necessary, to increase the apparent signal deviation, and system sensitivity.

We have observed that:

(a) for the maximum possible deviation in signal, the transceiver should be as close to the liner surface as possible, at least within one wavelength (three centimeters);

(b) maximum deviation occurs are the transceiver passes the edge of a hole or tap in the pipe;

(c) joints in the pipe may generate false maximums, so it is best if the approximate location of taps is known in advance.

In operation, the cutter unit is pushed or pulled through the pipe liner to the vicinity of the lateral tap, whose exact position need not be known. Once in the vicinity, the body is rotated by the operator (by energizing motor 32), so that the microwave transceiver is directed in the appropriate horizontal direction. Vertical may be determined, if there is some water in the lining, by scanning for the water stream to identify the "down" direction. Then, the entire unit is advanced slowly past the tap, while the operator observes the reflected wave level, and adjust the unit's lengthwise position for a maximum or minimum signal.

Since sewer lining is ordinarily made of a plastic material with good dielectric properties, it has little or no effect on the receiver level. However, clay pipe, backed with an earth ground, will reflect microwaves, and changes in the characteristics of the pipe, such as a void at the location of a tap, cause corresponding changes in the biasing level of the mixer diode. Depending on the interaction of the incident and reflected waves, the change in bias level may be an increase or a decrease. In any event, one looks for maximum deviation from a base signal, to locate discontinuities. The operator can learn by experience to discern between readings indicative of lateral taps and other discontinuities, such as cracks in the pipe.

Once the tap has been located, the feet 20 are extended by the operator by means of fluid pressure delivered through the appropriate conduits in the bundle 24. Now, the cutter head, initially retracted, is set in motion, and the cutter is extended toward the tap by means of pressure applied to the pistons 56. As the head advances, the pilot bit 80 first contacts, and pierces, the lining, which at this point is not backed by the sewer pipe material. Once the pilot has become established, the saw teeth 82 contact the liner, and quickly cut through it. The hole is then enlarged and finished by the radial leading edge, and then the peripheral tapered edge, of the reamer. Should a non-circular hole, or a hole of diameter greater than that already produced be desired, the cutter head can be moved longitudinally or laterally (actually, in a direction tangential to the liner) by applying appropriate pressures to the linear motors 45 and 48.

All during this process, the operator can observe the progress of the cutting operation on his monitor, and can adjust the course of the operation in accordance with what he sees.

Some possible variations of the invention have been mentioned above. Inasmuch as other variations and modifications of the invention will occur to those of skill in the art, the foregoing description should be regarded as merely illustrative of the invention defined by the following claims.

We claim:

1. A device for cutting lateral holes in a pipe liner, from the inside thereof, comprising
   a body movable within the pipe,
   a rotary cutter including a motor and a head, driven by said motor, for both boring and enlarging holes in the tube, means for supporting the cutter within said body, said means allowing three-dimensional translatory movement of the cutter with respect to said body, means for moving the cutter in any of said three directions with respect to said body, whereby holes of various sizes and shapes may be cut in the tube, and means for turning the body about its own axis, within the pipe, to align the cutter with a desired opening orientation.

2. The invention of claim 1, wherein the turning means comprises at least one casing surrounding only a portion of said body, means on said casing for engaging the surface of said liner, to fix the position of said casing, bearing means for permitting relative rotation between said casing and said body, means for rotating said body within said casing, and means for controlling said rotating means.

3. The invention of claim 2, wherein said body has a lateral aperture therein, and said rotary cutter extends through the aperture.

4. The invention of claim 1, further comprising a video camera mounted in said casing in a position to view said cutter head, and remote display means connected to said camera.

5. The invention of claim 1, further comprising a microwave transceiver mounted on said casing, for broadcasting microwaves toward said lined pipe and for receiving microwaves reflected therefrom, and remote means for monitoring the intensity of said reflected microwaves, whereby one can locate lateral taps to said pipe by observing deviations from a normal microwave intensity.

* * * * *